United States Patent
Lin et al.

(10) Patent No.: US 8,934,151 B1
(45) Date of Patent: Jan. 13, 2015

(54) SCANNING APPARATUS WITH AUTOMATIC CONTENT REPLACEMENT

(71) Applicant: Avision Inc., Hsinchu (TW)

(72) Inventors: Ching-Ching Lin, Hsinchu County (TW); Ming-Hsien Wu, Hsinchu County (TW); Shih-Kung Lee, Hsinchu (TW)

(73) Assignee: Avision Inc. (TW)

( * ) Notice: Subject to any disclaimer, the term of this patent is extended or adjusted under 35 U.S.C. 154(b) by 0 days.

(21) Appl. No.: 14/187,299

(22) Filed: Feb. 23, 2014

(30) Foreign Application Priority Data

Jan. 8, 2014 (TW) .............................. 103100706 A

(51) Int. Cl.
*G06F 3/12* (2006.01)
*H04N 1/04* (2006.01)
*H04N 1/46* (2006.01)
*H04N 1/40* (2006.01)
*H04N 1/00* (2006.01)
*G06F 17/21* (2006.01)

(52) U.S. Cl.
CPC ............ *G06F 17/212* (2013.01); *H04N 1/0049* (2013.01)
USPC .......... 358/474; 358/505; 358/448; 358/1.13; 358/1.15; 358/401; 358/1.1; 358/462; 358/530

(58) Field of Classification Search
USPC ........ 358/505, 448, 1.13, 1.15, 401, 1.1, 462, 358/530, 474
See application file for complete search history.

(56) References Cited

U.S. PATENT DOCUMENTS

| | | | |
|---|---|---|---|
| 7,006,260 B2 * | 2/2006 | Sato et al. ...................... | 358/448 |
| 8,503,012 B2 * | 8/2013 | Lee et al. ...................... | 358/1.15 |
| 2002/0075529 A1 * | 6/2002 | Sato et al. ...................... | 358/505 |
| 2007/0165248 A1 * | 7/2007 | Utsunomiya et al. .......... | 358/1.1 |
| 2010/0302601 A1 * | 12/2010 | Mori .............................. | 358/401 |
| 2011/0134490 A1 * | 6/2011 | Kashiwagi .................... | 358/448 |
| 2012/0105886 A1 * | 5/2012 | Takai et al. .................... | 358/1.13 |
| 2012/0140278 A1 * | 6/2012 | Sousa et al. ................... | 358/1.15 |
| 2013/0021633 A1 * | 1/2013 | Atsumi et al. ................. | 358/1.13 |

* cited by examiner

*Primary Examiner* — Charlotte M Baker
*Assistant Examiner* — Rury Grisham

(57) ABSTRACT

When an original is scanned by a scanning apparatus and the corresponding one or more page images are generated and temporarily stored in a storage unit of the scanning apparatus, these page images are sent to a display device for preview. As a new replacement sheet is detected by the scanning apparatus when one of the page images is currently previewed on the screen of the display device, the page image stored in the storage unit and currently previewed on the screen is replaced by a new page image of the replacement sheet. Finally, all the page images temporarily stored in the storage unit are outputted as an output file.

9 Claims, 5 Drawing Sheets

SCANNING APPARATUS WITH AUTOMATIC CONTENT REPLACEMENT

BACKGROUND OF THE INVENTION

1. Field of the Invention

The invention relates to a scanning apparatus, and more particularly, to a scanning apparatus with automatic content replacement in preview stage.

2. Description of the Prior Art

A conventional scanning apparatus is capable of outputting multi-pages content and displays it on a screen after scanning a plurality of documents or pages at one time. Once confirmed, an electronic file will be generated or the result is directly conveyed to a printer to be printed out. Usually when viewing the scanned and outputted content on a display device, the whole pages or some page must be scanned again and reedited on the computer if there is something wrong with the page.

For example, when the scanned pages are outputted as a portable document form (PDF) file, and one of the pages is found to need to rescan due to some reasons like stain, misplacement, skew, or error in the page, the rescanned page and the rest of the scanned pages should be brought into an editor software on the computer so that the updated rescanned page may be inserted into the originally scanned pages, with the effort of deleting the page to be replaced. It is apparently a tedious, inconvenient process, not to mention people have to pay to use the editor software in order to process some form of files. Besides, if the outputted content is sent to a printer or copy machine, waste of papers and toner is always unavoidable if replacement of correct pages is carried out.

SUMMARY OF THE INVENTION

To solve the problem of what the conventional scanning apparatus faces, embodiments of the invention provide a scanning apparatus capable of automatically replacing the content in preview stage.

An embodiment of the invention provides a scanning apparatus with automatic content replacement. The scanning apparatus includes an image capturing unit, a storage unit, a control unit, and an output module. The image capturing unit is utilized for capturing an original and generating a page image. The storage unit stores the page image. The control unit is connected to the image capturing unit and the storage unit. The control unit controls the scanning apparatus to enter a preview mode and connect a display device after the storage unit stores the page image. Under the preview mode, the control unit sends the page image to the display device for display. When detecting a replacement sheet under the preview mode, the control unit controls the image capturing unit to capture the replacement sheet and generate a new page image for replacing the page image stored in the storage unit. The output module is connected to the control unit for outputting the page image or the replacing new page image as a finished file.

According to the embodiment of the invention, when the image capturing unit captures a plurality of originals and generating correspondingly a plurality of page images, the storage unit is further utilized for storing the plurality of page images and the control unit further sends a first page image of the plurality of page images to the display device for display under the preview mode.

According to the embodiment of the invention, when under the preview mode and the control unit detects the replacement sheet, the control unit is further utilized for controlling the image capturing unit to capture the replacement sheet and generate the new page image for replacing the first page image of the plurality of page images stored in the storage unit.

According to the embodiment of the invention, the scanning apparatus further includes a sensor connected to the control unit for detecting whether the replacement sheet exists when the scanning apparatus is under the preview mode.

According to the embodiment of the invention, the scanning apparatus further includes a scanning flatbed in which the image capturing unit and the sensor are disposed. When the sensor detects the replacement sheet under the preview mode, the control unit controls the image capturing unit to capture the replacement sheet on the scanning flatbed and generate corresponding new page image for replacing the page image stored in the storage unit.

According to the embodiment of the invention, the scanning apparatus further includes an automatic feeding device at which the sensor is disposed. When the sensor detects the original or the replacement sheet, the control unit controls the automatic feeding device to feed the original or the replacement sheet for the image capturing unit to capture the original or the replacement sheet and generate the new page image.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. In the following discussion and in the claims, the terms "include" and "comprise" are used in an open-ended fashion. Also, the term "couple" is intended to mean either an indirect or direct electrical/mechanical connection. Thus, if a first device is coupled to a second device, that connection may be through a direct electrical/mechanical connection, or through an indirect electrical/mechanical connection via other devices and connections.

Figure 1:
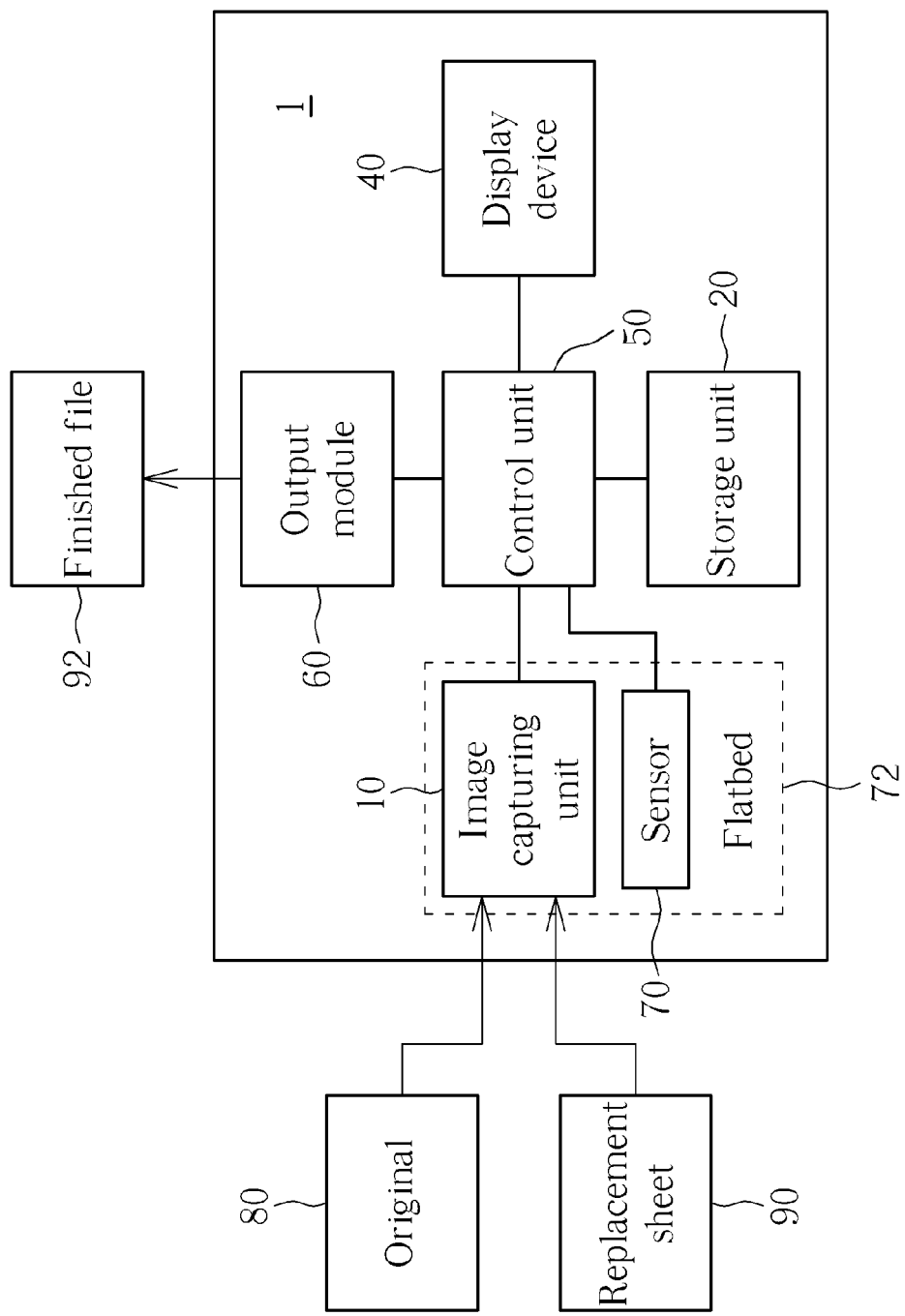
FIG. 1 is a functional block diagram of a scanning apparatus with automatic content replacement according to an embodiment of the invention.

Please refer to FIG. 1. FIG. 1 is a functional block diagram of a scanning apparatus with automatic content replacement according to an embodiment of the invention. The scanning apparatus 1 may be a flatbed scanner, a sheet-fed scanner, a portable scanner, an MFP (Multi-function Printer), etc., but the invention is not limited to this and the scanning apparatus 1 can be any image-processing apparatus having scanning functions. The scanning apparatus 1 includes an image capturing unit 10, a storage unit 20, a control unit 50, and an output module 60. The image capturing unit 10 is utilized for capturing an original 80 and generate a page image accordingly. The generated page image is then stored in the storage unit 20. The scanning apparatus 1 may further include a display device 40 for providing a preview function for the page image stored in the storage unit 20. The control unit 50, as the control center of the scanning apparatus 1, is connected to each component of the scanning apparatus 1 and takes control of each component for automatic content replacement.

Figure 2:
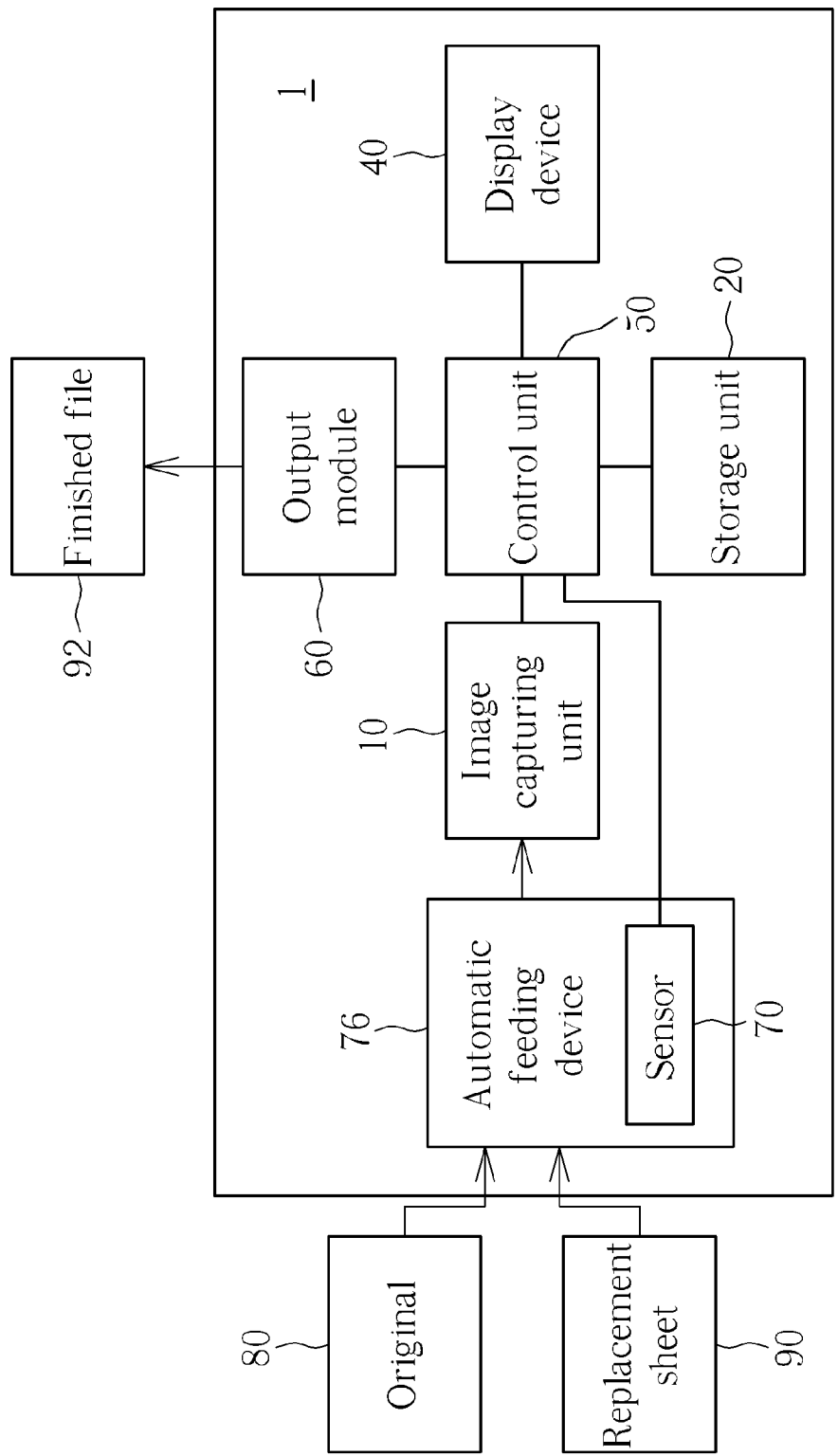
FIG. 2 is a functional block diagram of a scanning apparatus with automatic content replacement according to another embodiment of the invention.

Please refer to FIG. 1 and FIG. 2. FIG. 2 is a functional block diagram of a scanning apparatus with automatic content replacement according to another embodiment of the invention. The scanning apparatus 1 in the embodiments of the invention provides a function for automatically replacing the scanned content under a preview mode. It should be noted that the original 80 may be a single piece of paper or a document with a plurality of sheets. The image capturing unit 10 of the scanning apparatus 1 takes the first step to capture the original 80 and generate a page image. In the embodiment of the invention, the scanning apparatus 1 further includes a sensor 70 connected to the control unit 50. The sensor 70 detects whether the original 80 exists and the control unit 50 activates the scanning process according to the result of the detection from the sensor 70. As shown in FIG. 1, the image capturing unit 10 and the sensor 70 may be disposed in a scanning flatbed 72, which means the scanning apparatus 1 is a flatbed scanner, or at an automatic feeding device 76, which means the scanning apparatus 1 is a sheet-fed scanner and the control unit 50 controls the automatic feeding device 76 to feed the original 80 for scanning process. As the original 80 is captured by the image capturing unit 10 and the correspondingly generated page image is stored in the storage unit 20, the control unit 50 controls the scanning apparatus 1 to enter the preview mode. In other word, when the scanning apparatus 1 is under the preview mode, the scanned/captured page image has yet to be outputted actually (as an electronic file, be printed, or sent via an email), so as to be previewed and replaced if needed.

Figure 3:
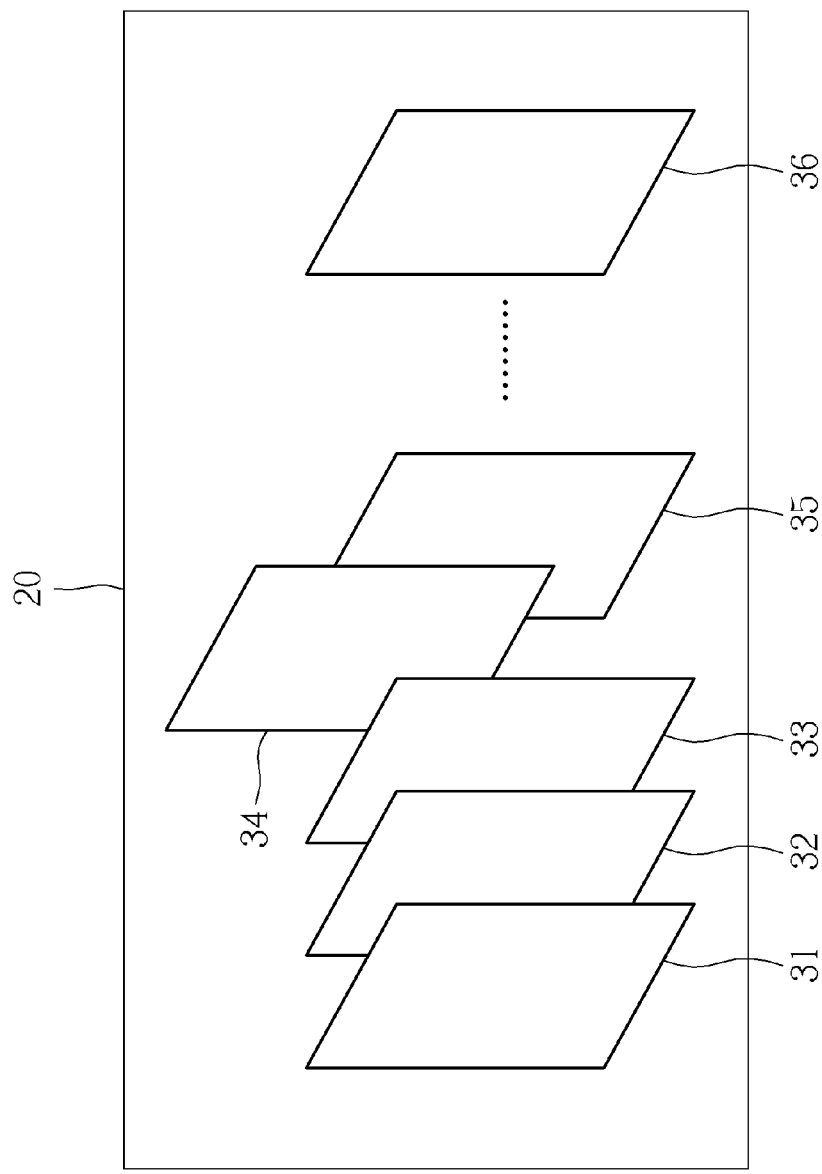
FIG. 3 is a schematic diagram showing a status of the storage unit of the scanning apparatus according to the invention.

Please refer to FIG. 3. FIG. 3 is a schematic diagram showing a status of the storage unit of the scanning apparatus according to the invention. When under the preview mode, the control unit 50 sends the page image corresponding to the original 80 to the display device 40 for display. The display device 40 may include, but not limited to, a display or a touch screen built in the scanning apparatus 1, or a display of a peripheral device or a computer. In a preferred embodiment, when the scanning apparatus 1 utilizes the image capturing unit 10 to capture the originals 80, the generated plurality of page images 31~36 is then stored in the storage unit 20.

Figure 4C:
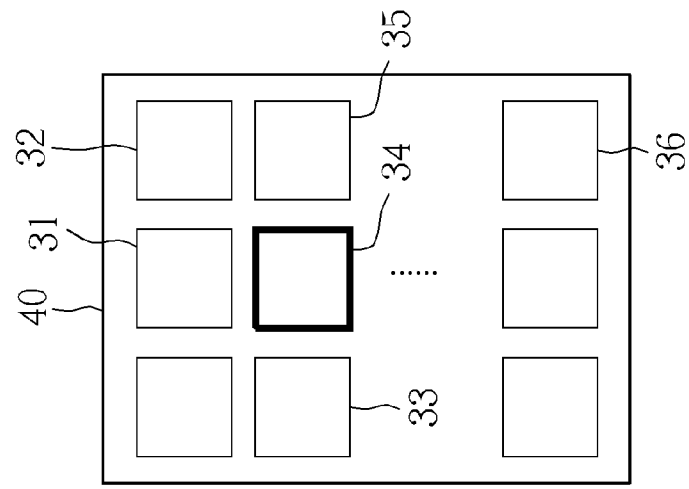
FIGS. 4A-4C are schematic diagrams of how the display device shows the plurality of page images after the page images are generated by the scanning apparatus.
Figure 4B:
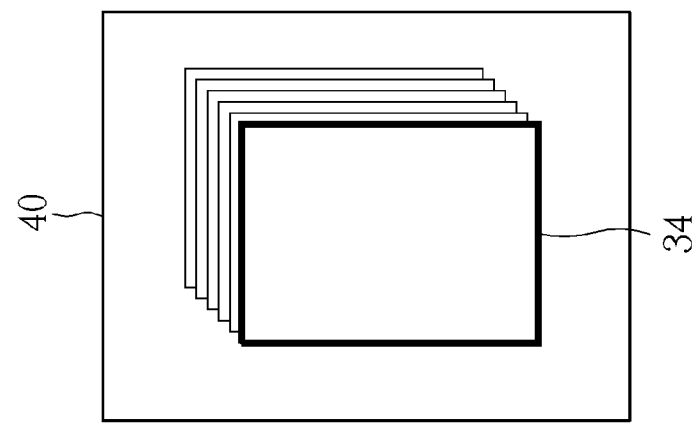
Figure 4A:
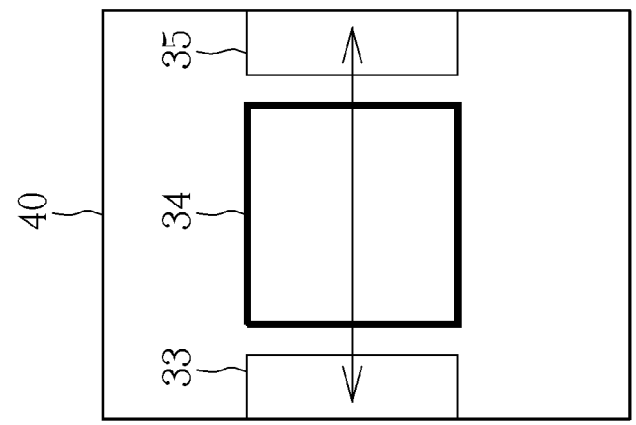

Please refer to FIGS. 4A~4C. FIGS. 4A~4C are schematic diagrams of how the display device shows the plurality of page images after the page images are generated by the scanning apparatus. The scanning apparatus 1 generates the plurality of page images 31~36 and stores them in the storage unit 20. Under the preview mode, the control unit 50 sends the page images 31~36 to the display device 40 to display. In the embodiments of the invention, the display device 40 may display the plurality of page images 31~36 as shown in FIG. 4A, which are displayed in a sliding manner either horizontally or vertically, in FIG. 4B, displayed to be a stack in a flipping manner, or in FIG. 4C, displayed in a mesh. Users can either directly touch and slide the images on the display device 40 or use buttons on the scanning apparatus 1 or an input device like a mouse or a keyboard to browse the images displayed on the display device 40. Whenever the user selects to preview some page image on the display device 40, the control unit sends the selected page image to the display device 40 for display.

Figure 5B:
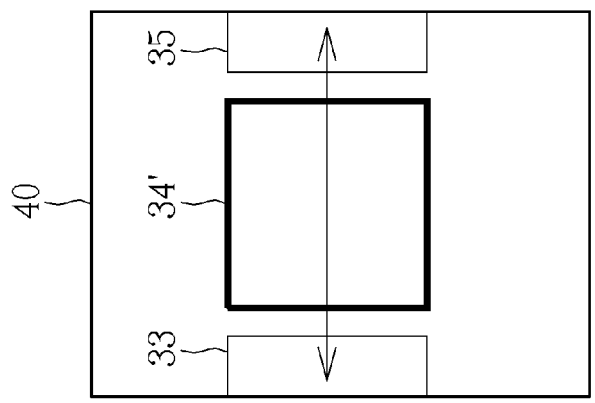
FIG. 5B is a schematic diagram showing the display device displaying the plurality of page images corresponding to FIG. 5A.
Figure 5A:
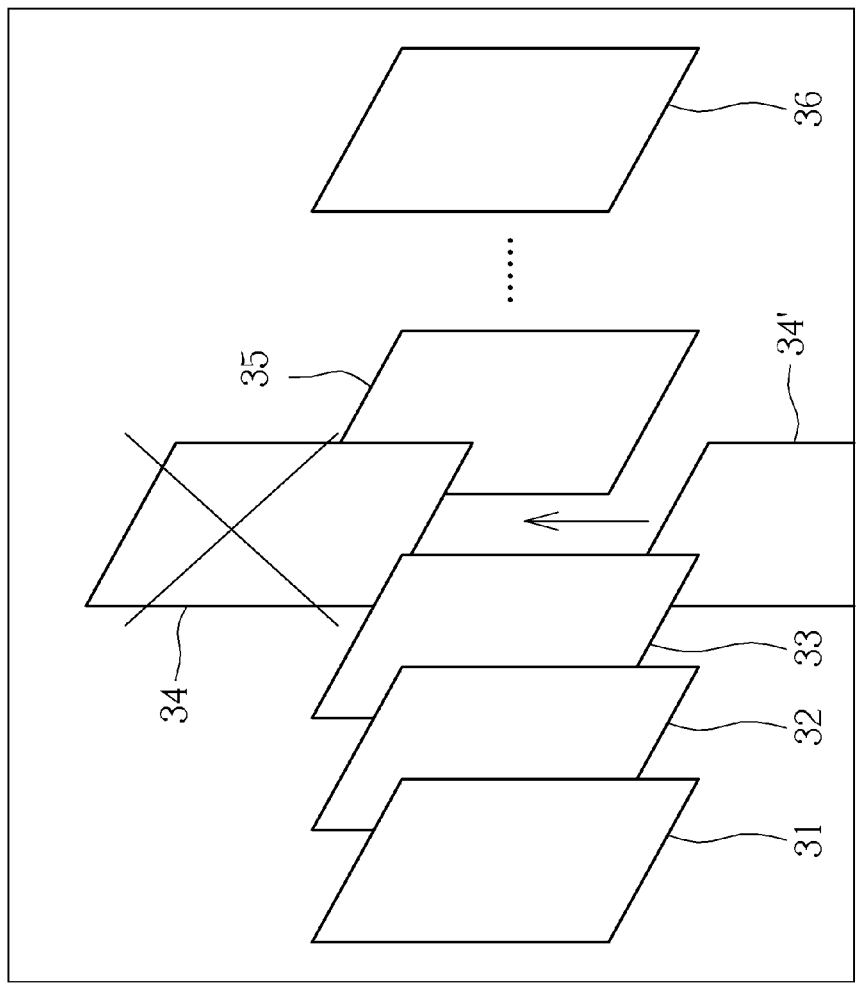
FIG. 5A is a schematic diagram showing the status of the storage unit as a page image is replaced.

Please refer to FIG. 5A and FIG. 5B. FIG. 5A is a schematic diagram showing the status of the storage unit as a page image is replaced and FIG. 5B is a schematic diagram showing the display device displaying the plurality of page images corresponding to FIG. 5A. Under the preview mode, when one of the page images, the page image 34 for example, needs to be replaced due to some reasons like stain, misplacement, skew, or error in the page, the image capturing unit 10 directly captures a replacement sheet 90 to generate a new page image 34' in substitute of the page image 34. Here is how it works: when the display device 40 is currently displaying the page image 34, i.e., at the status of the control unit 50 sending the page image 34 stored in the storage unit 20 to the display device 40 for display, as the sensor 70 detects the existence of the replacement sheet 90, the control unit 50 controls the image capturing unit 10 to capture the replacement sheet 90 and generate a new page image 34'. The control unit 50 then replaces the page image 34, which is currently displayed on the display device 40, stored in the storage unit 20 with the new page image 34' generated from the replacement sheet 90. In other words, as the user is viewing anyone of the page images 31~36 on the display device 40 under the preview mode and wants to replace the page image 34 as he/she is currently viewing the page image 34, the user needs only provide the replacement sheet 90 for the scanning apparatus 1 to generate the new page image 34' and replace the page image 34. During the process, the user needs no further complicated setting or operation to the scanning apparatus 1 like pushing some buttons, bringing up functional menus, or making further input. Simply providing the replacement sheet 90 automatically updates the scanned content. It should be noted that the replacement sheet 90 may also be the original 80 previously fed to the scanning apparatus 1. In such way, the content of each page of the originals 80 may be well examined and if needed, each one or more can be re-scanned to replace the original page image(s) stored in the storage unit 20. It doesn't have to re-scan all the originals or use editor software to replace the page after all the images are outputted.

All the work above is carried out under the preview mode before the actual output. Next, as each and every page image 31~36 that is temporarily stored in the storage unit 20 has been confirmed, the output module 60 then outputs the plurality of page images 31~33, 35, 36, which are unreplaced and stored in the storage unit 20, and the replacing new page image 34' as a finished file 92. Practically, the output module 60 may be at least one of the followings: a printing engine, a fax modem, a network communications module, and a removable storage device controller, outputting the finished file 92 via printing, faxing, emailing, sending to a USB mass storage device or network server, and the finished file 92 may be a portable document format (PDF) file, an image file, a printing file sent to a printing device, an email file, or a fax file.

In the embodiments of the invention, the scanning apparatus is capable of directly replacing the page image under the preview mode so as to reduce the work of edit at the computer. When the original is scanned by the scanning apparatus and the corresponding one or more page images are generated and temporarily stored in the storage unit of the scanning apparatus, these page images are sent to the display device for preview. As the new replacement sheet is detected by the scanning apparatus when one of the page images is currently previewed on the screen of the display device, the page image stored in the storage unit and currently previewed on the display device is replaced by the new page image of the replacement sheet. Finally, all the page images temporarily stored in the storage unit are outputted as the output file and can be selected to be printed, saved as an electronic file, emailed, or faxed. The scanning apparatus of the invention instantly replaces the currently previewed page image in a fast and convenient way, without taking too much effort of viewing or editing at the computer's end after the finished file is outputted.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A scanning apparatus with automatic content replacement, comprising:
    an image capturing unit for capturing an original and generating a page image;
    a storage unit for storing the page image;
    a control unit connected to the image capturing unit and the storage unit, the control unit controlling the scanning apparatus to enter a preview mode and connect a display device after the storage unit stores the page image, under the preview mode, the control unit sending the page image to the display device for display, and when detecting a replacement sheet under the preview mode, the control unit controlling the image capturing unit to capture the replacement sheet and generate a new page image for replacing the page image stored in the storage unit; and
    an output module connected to the control unit for outputting the page image or the replacing new page image as a finished file.

2. The scanning apparatus of claim 1, wherein when the image capturing unit captures a plurality of originals and generating correspondingly a plurality of page images, the storage unit is further utilized for storing the plurality of page images and the control unit further sends a first page image of the plurality of page images to the display device for display under the preview mode.

3. The scanning apparatus of claim 2, wherein when under the preview mode and the control unit detects the replacement sheet, the control unit is further utilized for controlling the image capturing unit to capture the replacement sheet and generate the new page image for replacing the first page image of the plurality of page images stored in the storage unit.

4. The scanning apparatus of claim 3, further comprising a sensor connected to the control unit for detecting whether the replacement sheet exists when the scanning apparatus is under the preview mode.

5. The scanning apparatus of claim 4, further comprising a flatbed in which the image capturing unit and the sensor are disposed, wherein when the sensor detects the replacement sheet under the preview mode, the control unit controls the image capturing unit to capture the replacement sheet on the flatbed and generate corresponding new page image for replacing the page image stored in the storage unit.

6. The scanning apparatus of claim 4, further comprising an automatic feeding device at which the sensor is disposed, wherein when the sensor detects the original or the replacement sheet, the control unit controls the automatic feeding device to feed the original or the replacement sheet for the image capturing unit to capture the original or the replacement sheet and generate the new page image.

7. The scanning apparatus of claim 3, wherein the output module outputs the plurality of unreplaced page images stored in the storage unit and the replacing new page image as the finished file.

8. The scanning apparatus of claim 3, wherein the output module comprises at least one of the followings: a printing engine, a fax modem, a network communications module, and a removable storage device controller.

9. The scanning apparatus of claim 8, wherein the finished file is a portable document format (PDF) file, an image file, a printing file sent to a printing device, an email file, or a fax file.

* * * * *